Oct. 5, 1943. C. R. HANNA 2,330,883
FRICTION DEVICE
Filed Feb. 10, 1937

WITNESSES:
INVENTOR
Clinton R. Hanna
BY
Paul E. Friedemann
ATTORNEY

Patented Oct. 5, 1943

2,330,883

UNITED STATES PATENT OFFICE 2,330,883

FRICTION DEVICE

Clinton R. Hanna, Pittsburgh, Pa.

Application February 10, 1937, Serial No. 125,043

10 Claims. (Cl. 188—152)

My invention relates to friction devices and more particularly to friction brakes.

One object of my invention is to produce a friction device which will produce a friction force that is substantially independent of the coefficient of friction between its relatively moving surfaces.

Another object of my invention is to produce a friction device having the foregoing characteristic for either direction of relative movement of its surfaces.

Another object of my invention is to produce a friction device having negative regenerative action only, whereby the performance varies by a smaller percentage than any percentage variation in the friction coefficient.

Another object of my invention is to produce a friction device having negative regenerative action for either direction of relative movement of its surfaces.

Another object of my invention is to produce a reversible friction brake having no positive regenerative action.

Another object of my invention is to produce a hydraulically actuated friction brake having only negative regeneration.

Another object of my invention is to produce a reversible friction brake having smooth quiet action for both directions of its operation and for transition from one direction of operation to the other direction of operation as in rolling back on a grade of a vehicle to be held by brakes.

Another object of my invention is to produce a negatively regenerative brake with automatic means for maintaining small clearance between drum and shoe whereby a lever system with larger mechanical advantage may be employed to offset the diminished braking caused by the negative regeneration.

Another object of my invention is to produce a simple automatic adjuster for maintaining fixed maximum clearance between two wearing members.

Another object of my invention is to produce a clearance adjusting means actuated by a loaded spring and limited in its movement by a second loaded spring.

Another object of my invention is to produce a hydraulically actuated friction brake with automatic clearance adjusting means.

In the prior art, the rotation of the brake drum of a friction brake has been used to increase braking action (and thereby reduce actuating forces) by the process known as servo or wrapping action which I shall call positive regeneration. With such devices if the coefficient of friction should increase, the regenerative action will also increase with the result that the braking for a given pedal pressure will increase by a percentage which is larger than the percentage variation in friction coefficient. It is even possible under extreme conditions for the brake to lock and thus require zero actuating force. Similar disproportionate effect occurs if the coefficient of friction should become lower. Thus for the advantage of diminished pedal pressures, a brake with varying performance subject to grabbing for high friction coefficients and greatly diminished braking for low friction coefficients is had.

My invention performs in a manner exactly opposite to the foregoing. The relative movement of the friction members instead of increasing the normal pressure between them by servo or wrapping action tends to reduce it by unwrapping action which I shall call negative regeneration. Some brakes of the prior art have had this characteristic to a partial extent but not entirely. In these prior art brakes no attempt at all was made to secure negative regeneration for two directions of movement. With my device there is negative regeneration with complete absence of positive regeneration, and provision is made for the same performance in both directions.

The result is a friction device which instead of grabbing for high coefficients of friction, increases in effect only slightly, and instead of failing for low coefficients of friction decreases in effect but slightly. The percentage change in performance is considerably less than any percentage change in the coefficient of friction, the ratio being of the order of one to three in good designs. This will be described in detail subsequently with reference to the drawing.

In order to compensate for the loss of assistance due to the absence of positively regenerative action in my device, I provide a simple arrangement for automatically maintaining small clearance between the friction members, so that I may employ a much higher leverage in the operating mechanism. In conventional brakes the movement of the pedal is small when the brakes are first adjusted and becomes progressively greater as the clearance at the brakes increases due to wear. In my device, the whole range or most of the range of pedal movement may be used to take up just the small fixed clearance maintained by the automatic adjusters inasmuch as no provision for wear need be made in pedal travel. Larger pedal movement for smaller clearance at the brake, of course, means greater leverage. Thus I overcome the only disadvantage of a completely negatively regenerative friction device, the inherent characteristics of which are so desirable in every other respect.

I have furthermore adapted the very desirable hydraulic actuation in my brake so as to benefit from its equalizing and low loss characteristics.

The novel features that I consider characteristic of my invention are set forth in the appended claims. The invention itself, however, both as to organization and its method of operation, together with additional objects and advantages will best be understood from the following description of a specific embodiment when read in connection with the accompanying drawing, wherein:

Figures 1, 2, 3, 4:
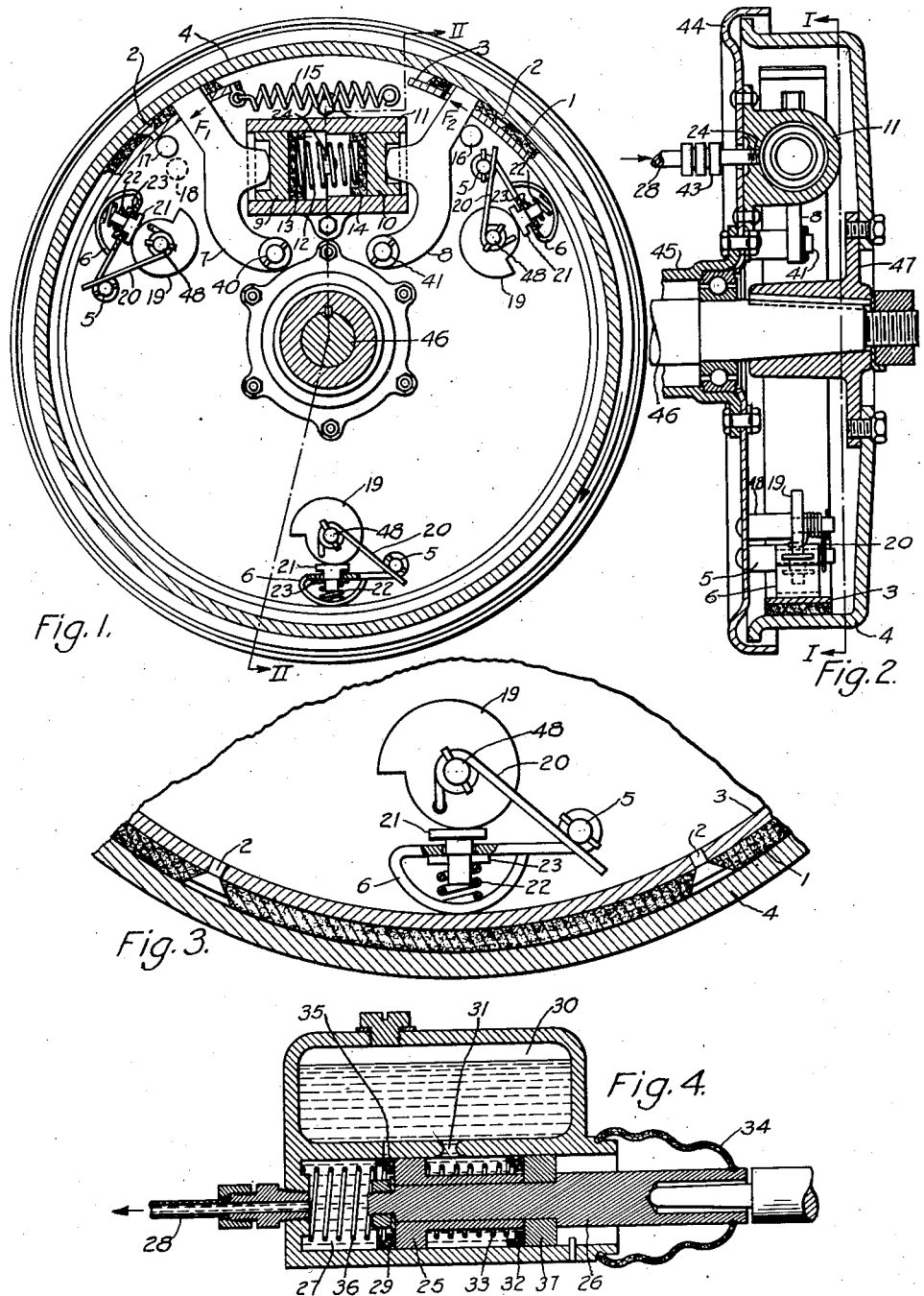
Figure 1 is an elevation showing the components of a vehicle brake with certain elements shown in section.
Fig. 2 is a diametrical sectional view of the brake.
Fig. 3 is an enlarged view of one of the automatic clearance adjusters.
Fig. 4 is a hydraulic cylinder which may be actuated by pedal or other means (not shown) to supply high pressure fluid to the brake or brakes.

Referring to Figures 1 and 2, the brake lining 1 fastened by rivets 2 to the flexible band 3 is shown in contact with the brake drum 4, the brake being applied. The band 3 is positioned by the barriers 6 which are part of the automatic adjusters to be described subsequently. Barriers 6 are pivotally mounted on pins 5. Tangential forces are applied to the ends of band 3 by the levers 7 and 8 which are pivotally mounted on pins 40 and 41. Levers 7 and 8 are actuated respectively by pistons 9 and 10 in the fluid pressure cylinder 11 which may have its bore slightly smaller on the right-hand end than on the left, as shown for purposes to be described later. Spring 12 positions gaskets 13 and 14 and holds the pistons 9 and 10 apart when the fluid pressure is low. Fluid enters the chamber between pistons 9 and 10 through threaded hole 24. Tubing 28 is connected to threaded hole 24 by the coupling 43.

As seen in Fig. 2, the back plate 44 mounted on stationary axle housing 45 serves to support the nonrotating parts of the brake such as pins 5, cylinder 11, pins 40 and 41, etc. Rotating drum 4 is coupled to the axle 46 by means of the flanged member 47.

Spring 15 serves to contract the band 3 for releasing the brake and also to urge the band and levers 7 and 8 in a clockwise direction so that the lever 8 is held against stationary stop 16 which is mounted on back plate 44. This, of course, is the band position for braking clockwise rotation arbitrarily taken here as forward. The arrow at the right in Fig. 1 shows the assumed direction of movement of drum 4.

Consider now the performance of the brake. Fluid pressure acting on piston 9 urges lever 7 counterclockwise. Most of the tangential force $F_1$ applied to the band 3 by lever 7 is useful for braking. A small fraction of this force, however, is transmitted through compression on the band 3 around to the lever 8 where it passes in a counterclockwise sense indicated as $F_2$ in the drawing. The lever 8 does not move counterclockwise, however, because of the much larger opposing effect of piston 10. The small counterclockwise force $F_2$ must exist because otherwise there could be no expansion of the band 3 and, therefore, no braking, but it is desirable to keep $F_2$ as small in relation to $F_1$ as possible for the following reasons.

Neglecting the slight differential area effect of the pressure cylinder 11, the only stationary member to take the reaction force for forward braking is the stop 16, inasmuch as both pistons 9 and 10 are free to move as a pair even when fluid pressure is between them. The reaction to force $F_1$ then appears at the pin 16 being transmitted through the levers and the hydraulic mechanism. The small force $F_2$ reduces the reaction at the pin 16 slightly so that the net braking is $F_1-F_2$. From this is seen the desirability of keeping $F_2$ small.

$F_2$ in relation to $F_1$ is dependent upon the band arc $\theta$ and the coefficient of friction $\mu$ in the following manner:

$$F_2 = F_1 \varepsilon^{-\mu\theta}$$

It is seen from the relation that large values of $\theta$ and $\mu$ are desirable so that $F_2$ will be small compared to $F_1$. With a band arc of 300° and a coefficient of friction of .4, $F_2$ is about 12% of $F_1$. Being small, it reduces the braking only slightly, but more important, it may vary considerably without changing the net braking $F_1-F_2$ greatly. As $\mu$ increases by a small fraction, $F_2$ decreases and $F_1-F_2$ is slightly greater, but the increase (with the value of $\mu$ and $\theta$ assumed here) is only about one-third as much as would be expected from the change in $\mu$. A decrease in $\mu$ is accompanied by a similar yet small reduction in braking effect.

If the coefficient of friction should increase by a large amount, the most the braking could possibly increase for the case assumed is 12%. This is because $F_2$ which normally reduced the braking by 12% cannot be made less than zero no matter how great $\mu$ is.

It is this feature which eliminates any possibility of grabbing or chattering in my brake. Physically, this may be seen as follows: The right-hand end of the band 3 during forward braking is prevented from wrapping action which would increase the braking. The left end of the band 3 must be pushed tangentially to the left. It should be remembered that this is a tangential not a normal force. Now if the coefficient of friction should increase by a very large amount, the unwrapping action due to rotation of the drum would cause the effective normal pressure between the shoe and drum to assume a lowered value such that the tangential braking force remains practically the same.

Having explained the operation for forward braking, reverse operation will now be considered. With the drum rotating counterclockwise, if pressure is applied to the cylinder 11, the band, and levers 7 and 8 will be rotated counterclockwise by friction until lever 7 is prevented from further movement by stop 17 supported on back plate 44. Spring 15 is too weak to prevent this movement. Now the leading or left end of the shoe is prevented from wrapping, and the trailing or right end is subject to the unwrapping action which is responsible for the uniform performance of my brake. Everything being reversed, the performance for reverse movement is the same as for forward movement.

The reason for having a small but definite free movement of the shoe before stop 17 is encountered is to provide for wear of the lining. As wear occurs, it is necessary that the band 3 be expanded by suitable adjusting means to maintain small clearance between shoe and drum. This necessarily reduces the clearance between lever 7 and stop 17. There must always be some clearance at this point to allow expansion of the band during brake operation. The initial clearance between 7 and 17 is chosen sufficiently great to provide for complete use of the lining at the point of maximum wear. About ⅜" clearance is all that is required with lining thicknesses and drum diameters such as are used on automotive vehicles.

It can be shown that the normal pressure at different points around the shoe because of the unwrapping action varies according to the same exponential law as the tangential force. This is given above. The normal pressure with the brake as shown in the drawing, will, therefore, vary from one end to the other by the same large factor as the tangential force which variation was of the order of eight to one.

For vehicle applications, the left end of the shoe will be subject to the greatest wear, and the right end the smallest, because forward braking is the rule. To provide for fuller utilization of the lining and at the same time keep the maximum clearance between lever 7 and stop 17 small, I provide a second position stop 18 for the stop 17 so that the band may be turned left to right and the unused lining placed in the position of maximum wear. Sufficient clearance between lever 7 and stop 18 now exists for completion of the lining wear.

On reverse braking, any sudden grabbing of the shoe 6 to rotate it counterclockwise into its correct position for this direction would result in clicking noise as lever 7 strikes stop 17. I make use of a very simple expedient to eliminate any uncontrolled rapid counterclockwise free rotation of the shoe by merely making piston 10 and its cylinder slightly smaller than piston 9 and its cylinder. The difference in diameter need be only ten or fifteen thousandths of an inch, and for this reason it results in negligible difference in force on the two pistons.

Now as friction rotates the shoe and levers counterclockwise during reverse braking, the pistons upon moving together to the left cause the cavity volume between them to increase. The fluid pressure immediately falls and the band 3 contracts a small amount. There being no actuating pressure, spring 15 holds the left end of the band from positive regeneration until the operator depresses the brake pedal to force more fluid into cylinder 11. Thus the rotation of the shoe to the left can proceed only as the operator supplies fluid to the increasing cylinder cavity. Ordinarily the pedal movement by the operator will be sufficiently slow that no clicking sound will be produced when lever 7 strikes stop 17. The difference in diameters of pistons 9 and 10 may be chosen in relation to the overall lever ratio of the braking system so that something less than an inch increase in pedal travel is required for reverse braking.

It will be understood that the reason for choosing different diameters for pistons 9 and 10 in my brake is not to obtain different forces thereon as has been desirable in some hydraulic brakes of the prior art. In my invention the difference in diameters must necessarily be quite small in order that the required difference in pedal position between reversed and forward braking shall be reasonably small. As before stated, the actual relative diameters are such that no great difference in piston force occurs.

To obtain the proper clearance between the brake lining 1 and the drum 4, I provide automatic clearance adjusting means which, although applicable to other types of brakes than the one herein described, is especially desirable with my brake because it allows the use of higher overall leverage ratios to offset the absence of servo action in my brake. Figures 1, 2 and 3 will reveal cams 19 pivotally mounted on pins 48 which are riveted to the back plate 44. Cams 19 are urged to rotate clockwise by loaded helical springs 20 which are under considerable angular deflection. The cams 19 rotate until they touch mushrooms 21 and are prevented from further movement by loaded compression springs 22 acting through washers 23 on shoulders of the mushrooms 21. The compression springs 22 are given an initial deflection when assembled. As noted in Fig. 3, the opposite end of spring 22 presses against the concave surface of barrier 6. The small diameter stems of mushrooms 21 serve as guides for the springs 22. The initial loading of springs 22 with relation to springs 20 is such that the cams 19, even with their wedging action, cannot rotate to push mushrooms 21 toward the barriers 6. Springs 20 may, therefore, be said to be relatively weaker than springs 22.

When the brakes are applied, as indicated in Figures 1 and 3, there is a small clearance (exaggerated) between the under-side of the mushrooms 21 and the barriers 6. If during the application of the brake, wear of the lining should occur, the mushrooms 21 will part away from the cams 19 and the springs 20 will immediately rotate the cams 19 to bring them again into contact with the mushrooms, but such rotation of the cams 19 cannot cause a reduction of the clearance between the mushrooms 21 and the barriers 6.

Upon releasing the brake by removing the hydraulic pressure from the cylinder 11, the release spring 15 contracts the band 3 pushing the barriers 6 inward against the force of springs 22 to take up the previously mentioned clearance between mushrooms 21 and barriers 6. Springs 22 in combination may be said to be relatively weaker than release spring 15. Thus a fixed release clearance between shoe and drum equal to the clearance between mushrooms 21 and barriers 6 is continually maintained by the gradual rotation of the cams 19. These are so designed as to be irreversible under the pressure of the mushrooms when the brake is released. Any vibrational inertia torques of the cams themselves due to rapid movement of the wheel on which the brake may be mounted, are likewise unable to cause deflection of either springs 20 or springs 22 to cause any spurious cam movement. The barriers 6 serve to isolate the adjusters from any disturbance which could occur as the band 3 undergoes its small angular movements, which take place for reverse braking operation. If, for example, the mushrooms 21 and loaded springs 22 were mounted so as to move along with the band 3, spurious rotation of the cams 19 would be possible.

The only other component part essential to the operation of my automatic adjusting mechanism is means for gradually filling the fluid chamber of cylinder 11 as the pistons become separated more and more during the automatic adjustment. It is seen that as the adjusters cause expansion of the band 3, pistons 9 and 10 are pushed apart by spring 12. There is nothing novel in the method of admitting fluid into a hydraulic brake actuating system to take care of leakage or a deficiency such as just described, but inasmuch as such means are necessary to make my brake completely automatic in maintaining adjustment, I show Fig. 4.

This is the hydraulic cylinder which supplies fluid under pressure for actuating the brake or brakes. The piston 25 is urged to the left by rod 26 which in turn is pushed by linkage from the pedal or other actuating means not shown. For the position of the piston as shown, the brake would be applied by the high pressure fluid in chamber 27 which is connected by means of tubing 28 to the cylinder 11 of the brakes. Gasket 29 prevents any but small leakage past the piston 25. Such leakage as does occur flows back into the fluid supply reservoir 30 through the large passage 31. Low pressure leakage from the cylinder at this position is prevented by gasket 32 positioned by spring 33 against piston 37. The flexible boot 34 serves to exclude dirt from the cylinder.

Replenishing fluid is supplied to the high pressure chamber and thence to the brake actuating cylinders when the piston 25 moves to the right sufficiently for gasket 29 to uncover the inlet passage 35. The spring 36 urges the piston to the right with sufficient force to overcome atmospheric pressure and friction when pedal pressure is removed. Any deficiency of fluid is thus replenished when the brakes are released.

I have, therefore, described a complete braking system having in combination, the following desirable features and advantages: (1) freedom from changes in performance as friction coefficient varies, (2) hydraulic actuation, (3) smooth, noiseless operation, (4) low required pedal pressure, and (5) automatic maintenance of adjustment. It will be evident that many features of my invention may be adapted to devices other than brakes. I desire, therefore, that only such limitations shall be imposed as are required by the prior art or indicated in the appended claims.

I claim as my invention:

1. A friction brake comprising a rotating drum, a shoe, means for restraining movement of one end of said shoe for one direction of rotation of said drum, means for restraining movement of the other end of said shoe for the opposite direction of rotation of said drum, said shoe being movable through a small arc to pass from one type of restraint to the other, and means to prevent rapid movement of said shoe through said arc.

2. A friction brake comprising a rotating drum, a shoe, hydraulic means for applying forces to said shoe, means for restraining movement of one end of said shoe for one direction of rotation of said drum, means for restraining movement of the other end of said shoe for the opposite direction of rotation of said drum, said shoe being movable through a small arc to pass from one type of restraint to the other, said hydraulic means preventing rapid movement of said shoe through said small arc.

3. A friction brake comprising a rotating drum, a single flexible band shoe, differential hydraulic means for applying forces to said shoe, means for restraining movement of one end of said shoe for one direction of rotation of said drum, means for restraining movement of the other end of said shoe for the opposite direction of rotation of said drum, said shoe as a whole being movable through a small arc to pass from one type of restraint to the other, said differential hydraulic means preventing the rotation of said drum from rapidly moving said shoe through said small arc.

4. A negatively regenerative friction brake comprising a rotating drum, a shoe, means for restraining movement of one end of said shoe for one direction of rotation of said drum, means for restraining movement of the other end of said shoe for the opposite direction of rotation of said drum, said shoe being movable through a small arc to pass from one type of restraint to the other, and means to prevent rapid movement of said shoe through said arc.

5. A negatively regenerative friction brake comprising a rotating drum, a shoe, hydraulic means for applying forces to said shoe, means for restraining movement of one end of said shoe for one direction of rotation of said drum, means for restraining movement of the other end of said shoe for the opposite direction of rotation of said drum, said shoe being movable through a small arc to pass from one type of restraint to the other, said hydraulic means preventing rapid movement of said shoe through said small arc.

6. A negatively regenerative friction brake comprising a rotating drum, a single flexible band shoe, differential hydraulic means for applying forces to said shoe, means for restraining movement of one end of said shoe for one direction of rotation of said drum, means for restraining movement of the other end of said shoe for the opposite direction of rotation of said drum, said shoe as a whole being movable through a small arc to pass from one type of restraint to the other, said differential hydraulic means preventing the rotation of said drum from rapidly moving said shoe through said small arc.

7. In a reversible negatively regenerative friction brake, in combination, a rotating drum; a flexible band shoe; means for restraining said shoe, against rotary movement with the drum, at one end of said shoe for a direction of rotation of said drum from the end of the shoe restrained against movement toward the end not restrained against movement; means for restraining said shoe, against rotary movement with the drum, at the other end of said shoe for the opposite direction of rotation of the drum, said shoe being mounted to be movable through a small arc to pass from one type of restraint to the other; means to prevent rapid movement of said shoe through said arc; and a plurality of brake shoe wear-compensating stops disposed at a plurality of points adjacent the shoe to maintain a given clearance, regardless of any wear of the shoe, between the shoe and drum, each of said stops comprising a cam rotatably mounted on the drum to take up the wear of the brake, a barrier mounted on the drum and having radial movement thereon, means for restraining said barrier against circumferential movement on the drum, said barrier being disposed between said cam and said shoe so that the arcuate movement of the shoe with reference to the drum during braking operation as well as during the small arcuate movement of the shoe as it passes from the said one type of restraint to the other does not cause any spurious rotation of said cam.

8. In a reversible negatively regenerative friction brake, in combination, a rotating drum; a single flexible band shoe having an arc greater than 180° disposed within the drum; hydraulic means for applying tangential forces to the ends of said shoe to cause engagement between the shoe and drum; means restraining the leading end of said shoe, with reference to one direction of rotation of said drum, against arcuate movement to effect negative regenerative braking; means for restraining the other end of said shoe, upon an opposite direction of rotation of said drum, against arcuate movement to effect reverse negative regenerative braking, said shoe being mounted on the drum for movement through a small arc upon passing from one type of restraint to the other, said hydraulic means including means for preventing rapid movement of said shoe through said small arc; and a plurality of brake wear-compensating stops mounted on the drum, said stops each including, a pivot bearing; a cam, having a generally spirally shaped peripheral contour, rotatably mounted on the pivot; a spring for rotating the cam on the pivot in a direction to decrease the radial distance between the cam periphery and shoe; a barrier, restrained against substantially all movements except radial movements, disposed between the cam and the shoe whereby any arcuate movements of the shoe cannot cause any spurious movement of the cam.

9. In a reversible negatively regenerative friction brake, in combination, a rotating drum; a single flexible band shoe having an arc greater than 180° disposed within the drum; hydraulic means for applying tangential forces to the ends of said shoe to cause engagement between the shoe and drum; means restraining the leading end of said shoe, with reference to one direction of rotation of said drum, against arcuate movement to effect negative regenerative braking; means for restraining the other end of said shoe, upon an opposite direction of rotation of said drum, against arcuate movement to effect reverse negative regenerative braking; said shoe being mounted on the drum for movement through a small arc upon passing from one type of restraint to the other, said hydraulic means including means preventing rapid movement of said shoe through said small arc; and a plurality of brake wear compensating stops mounted on the drum, said stops each including, a pivot bearing; a cam having a generally spirally shaped peripheral contour rotatably mounted on the pivot; a spring for rotating the cam on the pivot in a direction to decrease the radial distance between the cam periphery and shoe; a barrier, having an arcuate portion the outer surface of which contacts the shoe and a straight portion spaced from the arcuate portion, pivoted on the drum near the shoe so that there is substantially no arcuate movement of the barrier in a radius of the drum including the pivot of the cam; a generally mushroom shaped member with head and stem, having its stem slidably extending through an opening in the straight portion of the barrier, and having the axis of the stem substantially in said radius of the drum including the pivot of the cam, the top or inner surface of said head contacting said cam; a shoulder on the said stem spaced from the lower or outer surface of the head by a distance equal to the sum of the thickness of the straight portion at the region of the opening receiving the stem and the normal spacing between the shoe and drum when the brake is not set; a washer mounted on the stem and abutting against the shoulder or stem; and a compression spring disposed between the inner surface of the arcuate portion and the washer, under sufficient compression to prevent rotation of the cam through its action on the mushroom-shaped member.

10. In a reversible negatively regenerative friction brake, in combination; a rotating drum; a single flexible band shoe; brake actuating means for applying tangential forces to the ends of said shoe; means restraining the leading end of said shoe against arcuate movement, for one direction of rotation of the drum, to effect negative regenerative braking; means for restraining the other end of said shoe upon a reverse rotation of the drum to effect negative regenerative braking; said shoe being mounted on the drum for movement through a small arc upon passing from one type of restraint to the other; said brake actuating means including means for preventing rapid movement of said shoe through said small arc; and a plurality brake wear-compensating devices mounted at several circumferentially spaced points adjacent the shoe; each of said devices including a cam rotatably mounted in the plane of the radial movement of the shoe; a spring for rotating the cam in a direction to increase the radial distance between its axis of rotation and a point on the cam periphery falling in a radius of the drum normal to the axis of rotation of the cam; a barrier, disposed between the cam and shoe, including a stem normally contacting the cam to prevent rotation of the cam when in contact with the cam, a shoe contacting member movable radially with the shoe upon application of the brake but not circumferentially with the shoe upon any arcuate movement of the shoe, such as is occasioned by brake application, the small arcuate movement of the shoe when passing from one type of restraint to the other, or both, a spring, and washer means coating with the stem and shoe contacting member to cause relative movement of the stem and shoe contacting member for normal radial movements of the shoe to thus maintain the contact between stem and cam and to cause movement of the stem and shoe contacting member in unison to the extent of the wear of the shoe whereby the cam is released to rotate to take up the wear of the shoe.

CLINTON R. HANNA.